United States Patent [19]

Wood

[11] 3,756,416

[45] Sept. 4, 1973

[54] APPARATUS HAVING A FILTER PANEL DISPOSED ACROSS A FLUID PASSAGEWAY

[75] Inventor: Charles D. Wood, San Antonio, Tex.

[73] Assignee: Southwest Research Institute, San Antonio, Tex.

[22] Filed: June 9, 1971

[21] Appl. No.: 151,387

[52] U.S. Cl. ........................ 210/408, 55/96, 55/283, 55/291, 55/293, 55/300, 55/309, 55/428, 55/432

[51] Int. Cl. ........................ B01d 46/10

[58] Field of Search ................. 55/283, 71, 73, 288, 55/96, 293, 291, 300, 309, 328, 428, 432; 210/106, 108, 393, 411, 408

[56] References Cited

UNITED STATES PATENTS

| | | | |
|---|---|---|---|
| 211,033 | 12/1878 | Martin | 55/288 |
| 591,006 | 10/1897 | Parsons | 210/106 |
| 1,148,501 | 8/1915 | Collins | 55/284 |
| 1,400,169 | 12/1921 | Kling et al. | 55/300 |
| 3,407,572 | 10/1968 | Tolley | 55/283 |
| 3,411,272 | 11/1968 | Carmon | 55/310 |
| 3,493,116 | 2/1970 | Rosaen | 210/108 |
| 3,651,659 | 3/1972 | Nakao et al. | 55/467 |
| 3,608,278 | 9/1971 | Guenspan | 55/283 |

*Primary Examiner*—Bernard Nozick
*Attorney*—Hyer, Eickenroht, Thompson & Turner

[57] ABSTRACT

Apparatus in which a filter panel may be moved from a position across a fluid passageway for accumulating particulate material thereon to a position across an opening connecting a chamber with the passageway intermediate its ends. When the filter panel is positioned across the opening, particulate material is removed therefrom and collected in the chamber for diversion to a place of disposal remote from the passageway.

22 Claims, 4 Drawing Figures

Charles D. Wood
INVENTOR

BY Dyer, Eickenroht, Thompson & Turner
ATTORNEYS

Charles D. Wood
INVENTOR

BY Dyer, Eickenroht, Thompson & Turner
ATTORNEYS

APPARATUS HAVING A FILTER PANEL DISPOSED ACROSS A FLUID PASSAGEWAY

This invention relates in general to apparatus having a fluid passageway across which a filter panel is disposed for accumulating particulate material from the fluid. More particularly, this invention relates to improvements in apparatus of this type wherein particulate material accumulated on the filter panel may be removed therefrom and diverted to a place of disposal remote from the passageway without stoppage of fluid flow therethrough.

The need for such a filter panel may occur, for example, in the inlet to a gas turbine engine which would be seriously damaged by the particulate material, although obviously it would have utility in many other environments. In any event, it has heretofore been proposed to remove and collect the particulate material from the filter panels in place by causing blowers to traverse the downstream side of the filter panel and thereby force the particulate material to drop into a pan or tray on the upstream face of the filter panel. It has also been proposed to remove such material by suction heads which traverse the upstream side of the filter panel. In either case, the mechanisms for causing the blowers or suction heads to traverse the filter panel have been complicated and expensive. Also, in environments in which the particulate material must be removed fairly frequently, these devices must be operated substantially continuously, thereby causing relatively constant interference with normal fluid flow through the passageway.

An object of this invention is to provide apparatus of tis type which does not require such complicated and expensive mechanisms for traversing the filter panel.

Another object is to provide such apparatus in which there is a minimum of interference with normal fluid flow through the passageway during the removal cycle.

Still another object is to provide such apparatus in which particulate material is ordinarily removed only intermittently.

A further object is to provide such apparatus in which the particulate material may be removed, collected and diverted to a suitable place of disposal in a very simple and inexpensive manner.

These and other objects are accomplished, in accordance with the illustrated embodiment of my invention, by apparatus having a chamber having an opening connecting with the fluid passageway intermediate its ends, means for moving the filter panel between a position across the passageway to a position across the opening and with its upstream side facing the chamber, and means for removing particulate material from the filter panel and collecting it in the chamber when the filter panel is disposed across such opening. In the illustrated embodiment of the invention, such material is removed by causing fluid to flow through the filter panel and into the chamber, preferably by means of a suction pump connected to the chamber for withdrawing fluid therefrom to create a partial vacuum therein. This, of course, avoids disturbance of normal flow through the passageway and also provides a means for diverting the collected particulate material from the chamber and through the pump to a place of disposal.

Although fluid flow through the passageway is unfiltered while the filter panel is removed from its position across it, movement of the filter panel away from and back to filtering position is of very short duration, particularly as compared with the time interval in which it is normally positioned across the passageway. Also, precleaners may be disposed across the passageway upstream of the filter panel, and even though they may be less efficient than the filter panel, the over-all loss of efficiency would be quite small due to the short interval in which the filter panel is out of filtering position. Furthermore, since the means for moving the filter panel need only comprise a simple mechanical connection with an actuator outside the passageway, there is little or no obstruction of normal fluid flow.

A means is provided for sealing between the periphery of the filter panel and the opening as the filter panel moves into position across the opening, so as to prevent the escape of removed particulate into the passageway and confine the total energy of the pump for drawing a partial vacuum in the cleaner to removal of particulate on the filter panel. A means is also provided for jarring the filter panel as it moves into position across the opening so as to assist the partial vacuum in removing particulate material therefrom. In the illustrated embodiment of the invention, this means comprises a surface within the opening providing a limit stop to further movement of the filter panel into position across the opening.

The opening of the chamber is normally closed by suitable means, such as spring-pressed louvers, on the upstream side of the filter panel when it is disposed across and sealed with respect to the opening, and a means is provided for opening the louvers when the filter is so disposed. In this way, the partial vacuum which has been drawn in the chamber causes a rapid pressure drop across the filter panel, which greatly assists in removal of particulate material therefrom.

In the drawings, wherein like reference characters are used throughout to designate like parts:

Figure 2:
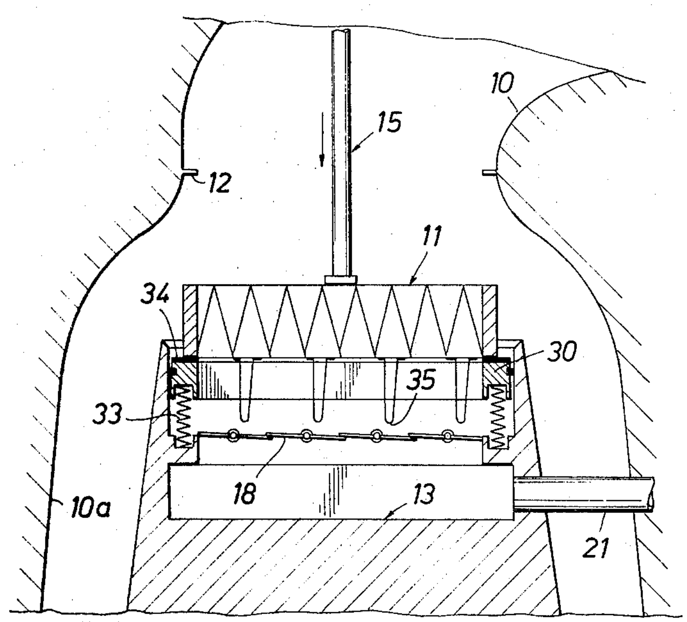
FIG. 2 is a partial view of the apparatus of FIG. 1, with the filter panel moved across and into the opening connecting the collection chamber with the passageway to engage with a seal carrier ring.
Figure 3:
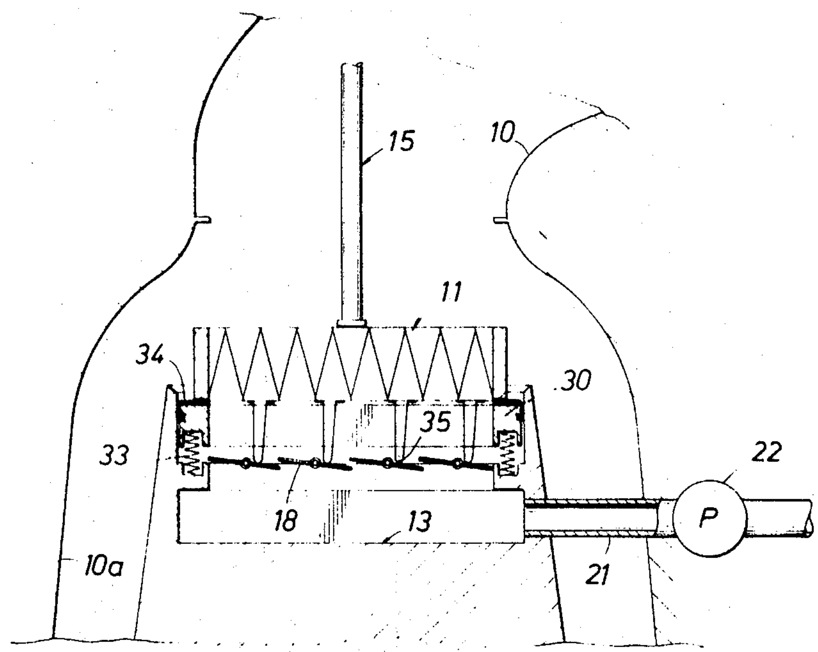
Figure 4:
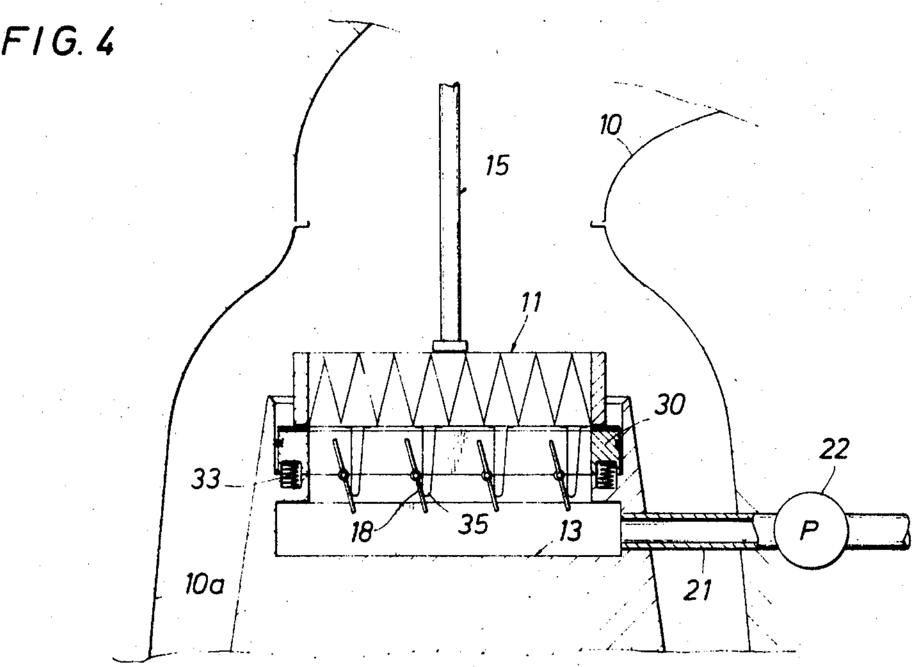

FIG. 3 is a view similar to FIG. 2, but upon continued movement of the filter panel into the opening to engage and partially open louvers which normally close the opening; and FIG. 4 is a view similar to FIG. 3, but upon further continued movement of the filter panel into a position within the opening in which it has fully opened the louvers and been jarred by engagement of the carrier ring with a stop surface within the opening.

Figure 1:
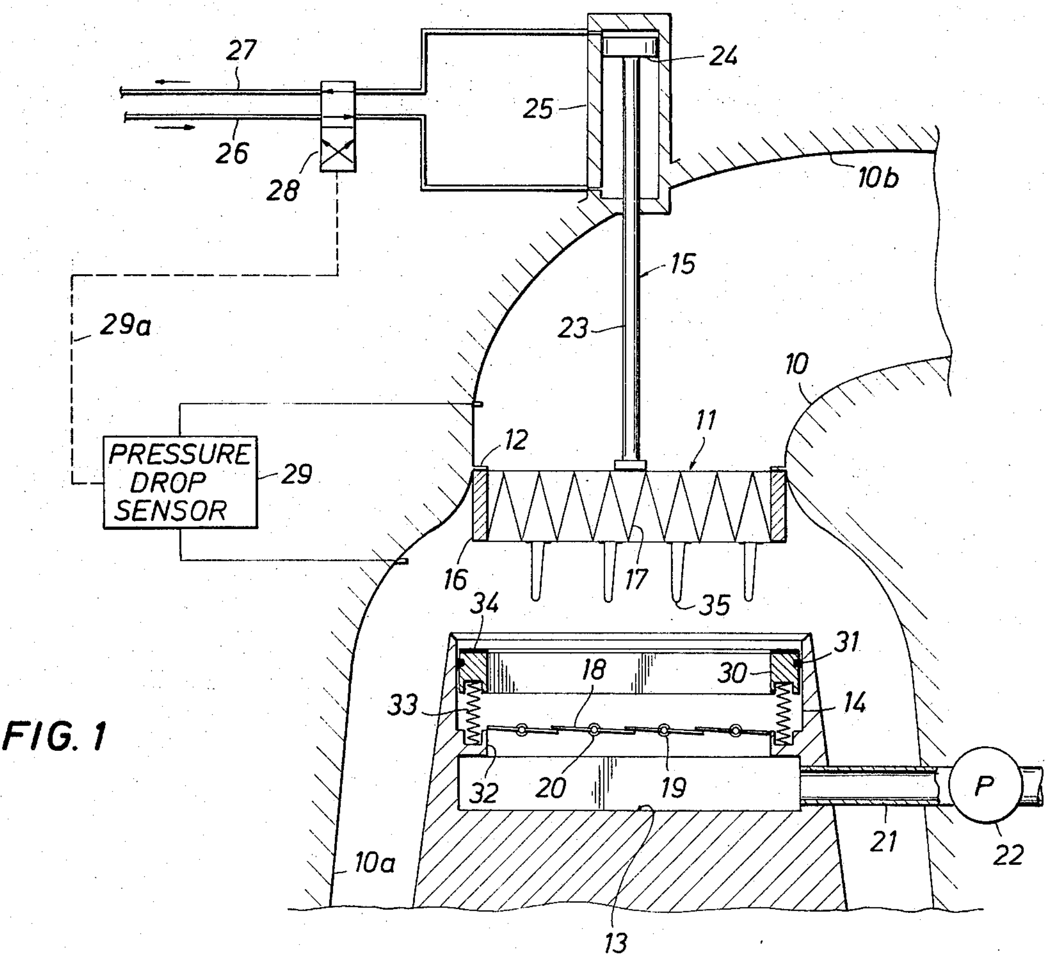
FIG. 1 is a sectional view of apparatus having a fluid passageway and a filter panel arranged therein to permit removal of particulate material therefrom in accordance with the present invention, and with the filter positioned across the passageway.

With reference now to the details of the above-described drawings, a passageway 10 is formed within apparatus, which may be the inlet to a gas turbine engine, for conducting fluid in the direction indicated by the arrows shown in FIG. 1. Obviously, however, and as previously mentioned, the passageway may be formed in other apparatus having a fluid passageway from which particulate material must be removed.

As illustrated, the fluid passageway 10 has an enlarged lower end 10a and a reduced upper end 10b which is bent at approximately a right angle to the lower end. A filter panel 11 is normally disposed in a first position across the flowway intermediate its upper and lower ends so as to accumulate particulate material on its lower or upstream side. In this first position, the upper periphery of the filter panel engages stops 12 in the passageway.

A collection chamber 13 is arranged centrally of the lower end 10*a* of the passageway and has an opening 14 which connects with the passageway beneath and axially aligned with the filter panel 11. Thus, the filter panel may be moved between its first position shown in FIG. 1 and a second position across and within the opening 14, as shown in FIG. 4, by a simple reciprocating actuator 15. However, it should be understood that this arrangement of the chamber and passageway is also merely illustrative, and that other arrangements are contemplated by this invention.

As illustrated diagrammatically, the filter panel includes a frame 16 and a pleated filtering medium 17 carried by the frame. Ordinarily, the filtering medium would be of a suitable fibrous material, either natural or synthetic. Again, however, this is merely illustrative, and the invention contemplates other types and shapes of filter panels. In any event, the opening 14 of the chamber 13 is of a size somewhat greater than and symmetrical with the filter panel so that the filter panel may be moved across and into the opening, as shown in FIGS. 2, 3 and 4.

The lower end of the opening 14 of the chamber 13 is normally closed by louvers or shutters 18 each of which is pivotally mounted about a shaft 19 extending across the opening. Torsion springs 20 or the like about the shaft urge the louvers to the closed position shown in FIG. 1, in which their adjacent end edges overlap.

A conduit 21 extends from connection with a side opening in the lower portion of chamber 13 to a suction pump 22 (see FIG. 1), which may be outside of the apparatus, and in any case removed from the passageway 10. As previously mentioned, and as will be described below, this permits fluid pressure within chamber 13 beneath the shutters 18 to be drawn down to at least a partial vacuum. It also serves to withdraw particulate material collected in the lower portion of the chamber out of the chamber and to a suitable place of disposal (not shown) beyond the pump.

The actuator 15 for moving the filter panel 11 between the first position of FIG. 1 and the second position of FIG. 4 includes a rod 23 connected to the top or downstream side of the filter panel 11 at its lower end. The upper end of the rod is connected to a piston 24 reciprocal within a cylinder 25 formed within the apparatus in axial alignment with the filter panel and chamber opening 14. The stroke of the piston and thus the rod 23 is sufficient to move the filter panel between its extreme first and second positions. The piston is caused to reciprocate, and thus to move the rod and filter panel in a desired direction, by means of operating fluid which is admitted to the cylinder through a line 26 and exhausted therefrom through line 27. A pilot valve 28 is connected to the lines 26 and 27 for selectively admitting and exhausting operating fluid with respect to opposite sides of the piston within the cylinder.

In the illustrated embodiment of the invention, movement of the filter panel from its first to its second position is initiated in response to a predetermined pressure drop across the filter panel in its first position, which of course is indicative of the accumulation of a predetermined amount of particulate material on the filter panel. For this purpose, and as illustrated diagrammatically in FIG. 1, a pressure drop sensor 29 connects with the upper and lower ends of the passageway above and below the filter panel 11 in its first position so as to sense and compare them. In response to a predetermined difference in these pressures, the sensor 29 transmits a signal to the pilot valve 28 through a line 29*a* for causing it to move from the position shown in FIG. 1 to its alternate position, in which operating fluid is directed to the top side and exhausted from the bottom side of piston 24. This, of course, causes the rod 23 and thus the filter panel 11 to move downwardly from the first position of FIG. 1 to the second position of FIG. 4. Return movement of the filter panel to its first position may be initiated in any number of ways, such as means in the sensor for causing the pilot valve to return to the position of FIG. 1 in response to a predetermined time interval following its actuation by the sensor.

A carrier ring 30 is axially movable within the opening 14 of the chamber and carries an O-ring 31 about its outer diameter for sealably sliding within the opening as it moves between an uppermost position shown in FIG. 1 and a lowermost position shown in FIG. 4. The carrier ring is located in its lowermost position by engagement of its lower end with a top surface on flange 32 about the intermediate portion of the chamber on generally the same level of the louvers 18. More particularly, the carrier ring is normally urged to its uppermost position by coil springs 33 disposed between the carrier ring and the flange 32 and may be located in its uppermost position by a suitable stop in the opening, or mrerely due to full extension of the coil springs.

A gasket 34 is disposed over the top of the carrier ring in position to be engaged by the lower edge of the frame 16 of the filter panel 11 as the filter panel moves downwardly from its first position to a position across and into the upper end of the opening, as shown in FIG. 2. The upward urging of the carrier ring due to the springs insures a tight seal between the filter panel and the opening 14 of the chamber during this initial movement of the lower end of the filter panel into the opening in the chamber.

Fingers 35 extend downwardly from the lower side of the filter panel for engaging the louvers 18 to one side of the shafts 19 on which they are rotatably mounted, and thus swinging them toward open position, as the filter panel moves further downwardly into the opening and against the force of the springs 33, as shown in FIG. 3. Prior to opening of the louvers, the fluid pressure in the lower portion of the chamber 13 beneath them has been drawn down to a partial vacuum by means of the suction pump 22 connecting with the chamber through conduit 21. More particularly, fluid pressure within the lower portion of the chamber has been drawn down to a sufficiently low level as to cause fluid within the passageway to reverse flow — i.e., to flow in a direction from the passageway into the chamber — upon opening of the louvers. For this purpose, the partial vacuum must be sufficiently low as to overcome the pressure drop across the filter panel 11 disposed across the opening, which filter panel of course has particulate material accumulated on its upstream side.

As previously mentioned, this is of great advantage in removing particulate material from the filter panel inasmuch as it provides in effect a blast of fluid across the filter panel as the louvers first begin to open. Inasmuch as the filter panel is sealed with respect to the opening 14 as the louvers are opened, the particulate material accumulated on the filter panel cannot escape back into the passageway 10. Furthermore, due to this sealing engagement between the filter panel and opening, all of the energy of the pressure drop induced by drawing of a partial vacuum within the chamber 13 is concentrated across the filtering medium of the filter panel.

Thus, at this stage of the operation of the apparatus, most of the particulate material is removed from the filter panel and caused to collect in the lower portion of the chamber 13. As will be apparent from the drawings, this material is immediately swept up from the collection chamber and through the conduit 21 for diversion to its place of disposal. Furthermore, this sweeping process is continuous during the actual removal of the particulate material so as to prevent the latter from building up and compacting in the chamber.

The suction pump 22 may, if desired, operate continuously so as to at all times draw a vacuum on the chamber 13. However, depending on the interval between successive particulate material removing operations, the pump may be shut down immediately following each such operation and then started up again in sufficient time prior to opening of louvers 18 as to draw the desired vacuum within the lower portion of the chamber.

As shown in FIG. 4, continued downward movement of the filter panel 11 to the second position of FIG. 4, will cause the louvers to be fully opened, and also cause the lower end of the carrier ring to strike the top surface of the flange 32 within the chamber opening 14. As previously mentioned, this will impart a jar to the filter panel 11 and thus further facilitate the removal of particulate material therefrom.

After a desired interval following jarring of the filter panel 11, the cycle is reversed, as previously described, so as to lift the rod 15 and thus raise the filter panel from the second position of FIG. 4 back to the first position of FIG. 1. During this time, of course, the carrier ring is caused to rise with the filter panel under the urging of the springs 33, so that it will be repositioned as shown in FIG. 1 for engagement by the filter panel 11 in a subsequent removal operation. Of course, as the fingers 35 on the lower side of the filter panel 11 are raised, the torsion springs 20 will automatically return the louvers 18 to the closed position of FIG. 1, whereby the lower portion of the chamber 13 is again closed off to permit the desired partial vacuum to be established by means of the pump 22.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus having a fluid passageway having opposite ends and a chamber having an opening connecting with the passageway intermediate its ends, a filter panel, means connected to the filter panel for moving it between a position across the passageway for accumulating particulate material from said fluid on its upstream side and a position across the opening and removed from across the passageway and with its upstream side facing said chamber, and means for removing particulate material from the upstream side of the filter panel, and collecting it in said chamber when said filter is across said opening, said chamber having another opening through which particulate material collected therein may be removed.

2. Apparatus of the character defined in claim 1, wherein said means for removing said particulate material comprises means for causing fluid to flow through the filter panel and into the chamber when the filter panel is across said opening.

3. Apparatus of the character defined in claim 2, including means for sealing between the periphery of the filter panel and said opening when the filter panel is across the opening.

4. Apparatus of the character defined in claim 1, wherein said means for removing said particulate material includes means for jarring said filter panel when it is across said opening.

5. Apparatus of the character defined in claim 4, including means for sealing between the periphery of the filter panel and said opening when the filter panel is across said opening.

6. Apparatus of the character defined in claim 4, wherein said means for removing particulate material also includes means for causing fluid to flow through the filter panel and into the chamber when the filter panel is across said opening.

7. Apparatus of the character defined in claim 6, including means for sealing between the periphery of the filter panel and said opening when the filter panel is across the opening.

8. Apparatus of the character defined in claim 2, wherein said means for causing fluid to flow through the filter panel includes means connecting with the other chamber opening for withdrawing fluid therefrom.

9. Apparatus of the character defined in claim 8, including means for normally closing said opening, and means for opening said closing means when said filter panel is across said opening.

10. Apparatus of the character defined in claim 9, including means for sealing between the periphery of the filter panel and said opening when the filter panel is across said opening and prior to opening of said closing means.

11. Apparatus of the character defined in claim 9, wherein said means for removing said particulate material includes means for jarring said filter panel when across said opening.

12. Apparatus of the character defined in claim 11, including means for sealing between the periphery of the filter panel and said opening when said filter panel is across said opening and prior to opening of said closing means.

13. Apparatus having a fluid passageway having opposite ends and a chamber having an opening connecting with the passageway intermediate its ends, a filter panel, means connected to the filter panel for moving it between a first position across the passageway for accumulating particulate material from said fluid on its upstream side and a second position into and across the opening and removed from across the passageway and with its upstream side facing said chamber, means for sealing between the periphery of the filter panel and said opening during movement of said filter panel toward said second position, and means connecting with said chamber for withdrawing fluid therefrom so as to cause fluid to flow through the filter panel and into said chamber when the periphery of said filter panel is sealed with respect to said opening.

14. Apparatus of the character defined in claim 13, including means providing a surface within said opening for jarring the filter panel upon movement of the filter panel into said second position.

15. Apparatus of the character defined in claim 13, wherein said sealing means comprises a carrier ring movable axially within said opening and having a sealing surface engageable by the periphery of said filter panel upon movement of said filter panel toward said second position, a seal ring carried by the carrier ring for sealably sliding within said opening, and spring means within said opening yieldably urging said carrier ring toward the connection of said opening with said passageway.

16. Apparatus of the character defined in claim 15, including means providing a surface within said opening for jarring the filter panel upon movement of said filter panel into said second position.

17. Apparatus having a fluid passageway having opposite ends and a chamber having an opening connecting with the passageway intermediate its ends, a filter panel, means connected to the filter panel for moving it between a first position across the passageway for accumulating particulate material from said fluid on its upstream side facing said chamber and a second position into and across the opening and removed from across the passageway and with its upstream side facing said chamber, means normally closing said opening on the upstream side of the filter panel in its second position, means for sealing between the periphery of the filter panel and said opening during movement of said filter panel toward said second position, means for opening the closing means upon continued movement of the filter panel toward said second position, and means connecting with said chamber for withdrawing fluid therefrom so as to cause fluid to flow through the filter panel and into said chamber upon opening of said closing means.

18. Apparatus of the character defined in claim 17, wherein said means normally closing said opening comprises louvers which are spring pressed to closed position.

19. Apparatus of the character defined in claim 18, including means on the filter panel for moving said louvers to open position.

20. Apparatus of the character defined in claim 17, including means providing a surface within said opening for jarring the filter panel upon continued movement of said filter panel into said second position.

21. Apparatus of the character defined in claim 17, wherein said sealing means comprises a carrier ring movable axially within said opening and having a sealing surface engageable by the periphery of said filter panel upon movement of said filter panel toward said second position, a seal ring carried by the carrier ring for sealably sliding within said opening, and spring means within said opening yieldably urging said carrier ring toward the connection of said opening with said passageway.

22. Apparatus of the character defined in claim 21, including means proviidng a surface within said opening for jarring the filter panel upon continued movement of said filter panel into said second position.

* * * * *